United States Patent
Zaharkin (10) Patent No.: US 9,652,439 B2
(45) Date of Patent: *May 16, 2017

(54) SYSTEM FOR CONVERTING DATA TO A MARKUP LANGUAGE

(71) Applicant: Thomson Reuters Global Resources, Baar (CH)

(72) Inventor: Michael S. Zaharkin, Spencerport, NY (US)

(73) Assignee: Thomson Reuters Global Resources, Baar (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/450,963

(22) Filed: Aug. 4, 2014

(65) Prior Publication Data

US 2015/0026202 A1 Jan. 22, 2015

Related U.S. Application Data (60) Division of application No. 12/799,480, filed on Apr. 26, 2010, now Pat. No. 8,799,768, which is a division (Continued)

(51) Int. Cl.
*G06F 17/00* (2006.01)
*G06F 17/21* (2006.01)
(Continued)

(52) U.S. Cl.
CPC ........ *G06F 17/218* (2013.01); *G06F 17/2247* (2013.01); *G06F 17/2264* (2013.01);
(Continued)

(58) Field of Classification Search
CPC .. G06F 17/2247; G06F 17/27; G06F 17/3053; G06F 17/218; G06F 17/227; G06F 17/30327
See application file for complete search history.

(56) References Cited

U.S. PATENT DOCUMENTS 5,157,783 A 10/1992 Anderson et al.
5,265,065 A 11/1993 Turtle
(Continued)

OTHER PUBLICATIONS

Hunter, B., "Conversion of documents to and from SGML", IEEE Colloquium on Adding Value to Documents with Markup Languages, INSPEC Accession No. 4765010, 51-54, 1994, (5 pages).
(Continued)

*Primary Examiner* — Jennifer To
*Assistant Examiner* — Joseph R Burwell
(74) *Attorney, Agent, or Firm* — Norton Rose Fulbright US LLP (57) ABSTRACT

Systems and methods are provided through which data parseable against a document type definition by generating a list of a possible paths of an input element that is not encoded against the document type definition, determining the path that is the best fit with the document type definition, and then generating the element in the syntax of the document type definition. Determining the path that is the best fit includes parsing the path against the document type definition. The best fit is expressed in a scoring scale, in which the best score indicates the best fit. Thereafter, the path with the best fit is translated in accordance to the document type definition or markup language.

4 Claims, 6 Drawing Sheets

Related U.S. Application Data of application No. 10/023,440, filed on Dec. 14, 2001, now Pat. No. 7,707,492, which is a continuation of application No. PCT/US00/16482, filed on Jun. 14, 2000.

(60) Provisional application No. 60/138,979, filed on Jun. 14, 1999.

(51) Int. Cl.
    *G06F 17/22*      (2006.01)
    *G06F 17/27*      (2006.01)
    *G06F 17/30*      (2006.01)

(52) U.S. Cl.
    CPC ........ *G06F 17/27* (2013.01); *G06F 17/30011* (2013.01); *G06F 17/30115* (2013.01)

(56) References Cited

U.S. PATENT DOCUMENTS

| | | | |
|---|---|---|---|
| 5,418,948 A | 5/1995 | Turtle | |
| 5,434,932 A | 7/1995 | Scott | |
| 5,488,725 A | 1/1996 | Turtle et al. | |
| 5,497,317 A | 3/1996 | Hawkins et al. | |
| 5,583,762 A | 12/1996 | Shafer | |
| 5,629,846 A | 5/1997 | Crapo | |
| 5,644,720 A | 7/1997 | Boll et al. | |
| 5,727,081 A * | 3/1998 | Burges | G06K 9/342 382/161 |
| 5,848,386 A | 12/1998 | Motoyama | |
| 5,907,851 A | 5/1999 | Yamakawa et al. | |
| 5,915,259 A * | 6/1999 | Murata | G06F 17/272 715/210 |
| 6,009,436 A | 12/1999 | Motoyama et al. | |
| 6,061,697 A | 5/2000 | Nakao | |
| 6,519,617 B1 | 2/2003 | Wanderski et al. | |
| 6,687,404 B1 | 2/2004 | Hull et al. | |
| 6,912,538 B2 | 6/2005 | Stapel et al. | |
| 7,174,327 B2 | 2/2007 | Chau et al. | |
| 7,281,203 B2 | 10/2007 | Gessner | |
| 7,305,614 B2 | 12/2007 | Chen et al. | |
| 2002/0002566 A1 | 1/2002 | Gajraj | |
| 2002/0032709 A1 | 3/2002 | Gessner | |
| 2004/0060003 A1 | 3/2004 | Mani et al. | |

OTHER PUBLICATIONS

Morishima et al., A Data Modeling Approach to the Seamless Information Exchange Among Structured Documents and Databases, 1997 ACM, pp. 78-87 (10 pages).

"Well-formed and Valid XML Documents", Pineapplesoft Link, May 1998, (5 pages).

International Preliminary Examination Report for PCT/US00/16482 mailed on Sep. 7, 2001 (6 pages).

International Search Report for PCT/US00/16482 mailed on Sep. 19, 2001 (2 pages).

Written Opinion for PCT/US00/16482 mailed on May 7, 2001 (5 pages).

Choy et al., "Conversion of Structured Documents for Filing", IBM Technical Disclosure Bulletin, TDB 08-88, pp. 30-31, Aug. 1998.

Bolik, Generic Converter for Standard Generalized Markup Language Documents, IBM Technical Disclosure Bulletin, V. 41, n. 01, pp. 97-98, Jan. 1998.

Dorrance et al., "An Automated Technique for Mapping Presentation of Different Datastreams", Research Disclosure, v. 42, n. 420, article 42090, Apr. 1999.

* cited by examiner

SYSTEM FOR CONVERTING DATA TO A MARKUP LANGUAGE

RELATED APPLICATION

This application is a divisional of U.S. application Ser. No. 12/799,480 filed on Apr. 26, 2010 now U.S. Pat. No. 8,799,768, which is a divisional application of U.S. patent Ser. No. 10/023,440 filed on Dec. 14, 2001, now U.S. Pat. No. 7,707,492 which is a Continuation of International Patent Application No. US00/16482 which claims the benefit of U.S. Provisional Application Ser. No. 60/138,979 filed Jun. 14, 1999 under 35 U.S.C., 119(e). Each of these applications are incorporated herein by reference.

TECHNICAL FIELD

This invention concern methods of converting electronic documents from one format to another format, particularly methods of converting documents to a Standard Generalized Markup Language (SGML) or an Extensible Markup Language (XML).

BACKGROUND OF THE INVENTION

Some electronic documents include text and annotation elements which indicate the semantics, hierarchy, structure, or format of the documents. The annotation elements, known as markups, within a document generally conform to a markup language which defines a set of annotation elements. The markup language defines which elements in the language are required elements, which elements are optional elements, and how annotation elements distinguish from neighboring text. Examples of markup languages include Standard Generalized Markup Language (SGML), Extensible Markup Language (XML), and hypertext markup language (HTML).

Additionally, electronic documents with markups are also associated with document type definition (DTD). The DTD for a particular document defines the rules and format of the document in terms of a set of declarations for a markup language, such as SGML or XML. The DTD for the document is either embedded in the document or resides in a separate document associated the document. The DTD is used in parsing the document, that is, breaking the document into smaller chunks of data for further processing.

Conventionally, marking up documents according a markup language entails inputting the document into a specific custom-conversion program designed for marking up documents in the markup language. Examples of custom conversion programs are programs created using tools such as Omnimark and Balise. Thus, for example, marking up a document in SGML requires use of an SGML conversion program and marking up a document in HTML requires use of an HTML conversion program. In other words, the conventional approach to marking up documents uses DTD-specific conversion programs.

This conventional approach suffers from at least five problems. First, because the converters are dependent on the structure of a single DTD, they cannot be used to markup documents according to other markup languages. Second, the converter cannot easily adapt to changes to its corresponding DTD, since the grammatical and semantic rules of the DTD are hard-coded into the converter, requiring the logic of the converter to be reprogrammed. Third, the hard-coded DTD semantics in the converter increases its size and complexity, and thus reduce its reliability. Fourth, the dependency of the converter on a specific DTD also reduces the reusability of its source code for other DTDs. And fifth, conventional converters follow an all-or-nothing approach to markup, which prevents them from outputting a document with marked and unmarked portions. This restriction reduces the flexibility and application of the converter.

Accordingly, there is a need in the art for a better ways of marking up documents.

SUMMARY

To address these and other problems, the inventor devised systems, methods, and software for handling documents with different document type definitions (DTDs.) One exemplary method receives a document and an associated DTD, generates a mapping file from the document and the DTD, with the mapping file having one node representing each possible mapping of an element of the DTD to a portion of the document. The exemplary method further generates one or more paths representing possible paths from one node in the mapping file to another node in the mapping file, scores each possible path, and selects one of the paths based on the scores. Finally, the selected path is converted into a language described by the DTD.

DETAILED DESCRIPTION OF THE PREFERRED EMBODIMENTS

The following detailed description, which references and incorporates the Figures, describes and illustrates one or more specific embodiments of the invention. These embodiments, offered not to limit but only to exemplify and teach the invention, are shown and described in sufficient detail to enable those skilled in the art to practice the invention. Thus, where appropriate to avoid obscuring the invention, the description may omit certain information known to those of skill in the art.

The detailed description is divided into five sections. The first section describes an exemplary computer system that incorporates the invention. The second section provides a system level overview of the invention. The third section describes examples of methods for an embodiment of the invention. The fourth section describes a particular SGML based implementation of the invention. Finally, the fifth section summarizes some advantages or salient features of the exemplary embodiment.

Exemplary Computer System Incorporating Invention

Figure 1:
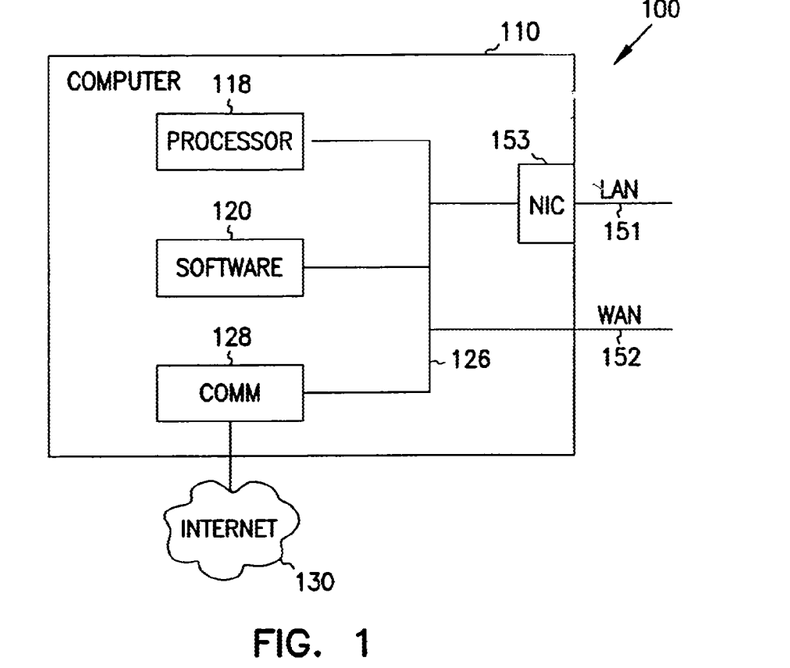
FIG. 1 is a block diagram of an exemplary computer system incorporating the invention.

FIG. 1 is a block diagram of an exemplary computer system (or environment) 100 incorporating the invention. The description of FIG. 1 provides an overview of a computer hardware and a suitable computing environment in conjunction with which some embodiments of the present invention can be implemented. Embodiments of the present invention are described in terms of a computer executing computer-executable instructions. However, some embodiments of the present invention can be implemented entirely in computer hardware in which the computer-executable instructions are implemented in read-only memory. One embodiment of the invention can also be implemented in client/server computing environments where remote devices that are linked through a communications network perform tasks. Program modules can be located in both local and remote memory storage devices in a distributed computing environment.

Computer 110 includes a processor 118, commercially available from Intel, Motorola, Cyrix and others, software 120, and a system bus 126, that operatively couples various system components including the system memory to the processing unit 118. For example, some embodiments implement one or more portions of system 100 using one or more mainframe computers or servers, such as the Sun Ultra 4000 server.

The processor 118 executes exemplary DTD-independent document-conversion software 120. Embodiments of the present invention are not limited to any type of computer 110. In varying embodiments, computer 110 comprises a PC-compatible computer, a MacOS-compatible computer or a UNIX-compatible computer. The construction and operation of such computers are well known within the art.

Furthermore, computer 110 can be communicatively connected to the Internet 130 via a communication device 128. In one embodiment, a communication device 128 is a modem that responds to communication drivers to connect to the Internet via what is known in the art as a "dial-up connection." In another embodiment, a communication device 128 is an Ethernet or similar hardware (network) card connected to a local-area network (LAN) that itself is connected to the Internet via what is known in the art as a "direct connection" (e.g., T1 line, etc.).

Computer 110 can be operated using at least one operating environment to provide a graphical user interface including a user-controllable pointer. Such operating environments include operating systems such as versions of the Microsoft Windows and Apple MacOS operating systems well-known in the art. Embodiments of the present invention are not limited to any particular operating environment, however, and the construction and use of such operating environments are well known within the art.

The computer 110 can operate in a networked environment using logical connections to one or more remote computers. These logical connections are achieved by a communication device coupled to, or a part of, the computer 110. The logical connections depicted in FIG. 1 include a local-area network (LAN) 151 and a wide-area network (WAN) 152.

Exemplary System Level Overview

Figure 2:
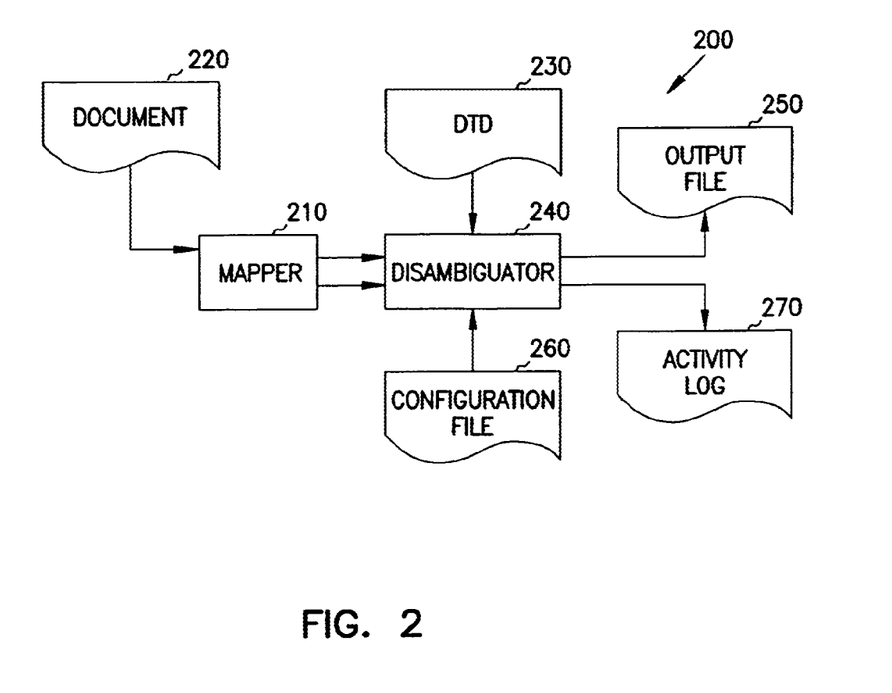
FIG. 2 is a block diagram of an exemplary system for disambiguating data according to the invention.

FIG. 2 shows an exemplary DTD-independent document-conversion system 200 incorporating the present invention. System 200 includes a mapper 210 that receives a document 220 of ambiguated and/or ambiguous data. The mapper 210 creates a mapping file (not shown) from the document 220. The mapping file (not shown) is transmitted to the disambiguator 240. The disambiguator 240 receives the mapping file and the document type definition (DTD) 230. The disambiguator 240 converts the mapping file into an output file 250 that complies with the DTD 230 and/or disambiguates the mapping file in reference to, or based on, the DTD. The disambiguator 240 eliminates the need for specific programmatic solutions. The disambiguator 240 satisfies the need for a DTD-specific or a DTD-dependent translator.

System 200 includes a configuration file 260 that is received by the disambiguator 240 which specifies predetermined settings and/or parameters describing how the disambiguation process of the disambiguator 240 operate. For example, one setting and/or parameter that specifies the markup syntax of the DTD 230 and the output file 250, such as Extensible Markup Language (XML) and/or Standard Generalized Markup Language (SGML).

System 200 also includes an activity log 270 that receives from the disambiguator 240 information that describes the activity of the conversion process of the disambiguator 240, and records the information. The disambiguator 210 can be embodied as computer hardware circuitry or as a computer-readable program, or a combination of both.

System 200 also includes one or more DTDs in addition to DTD 230, which enables selective conversion to one of a plurality of markup languages. DTD input is selected from one of the plurality of DTDs. The indicator of which DTD to select is in the document 220, the configuration file 260, or from a different source.

Exemplary Methods of the Invention

In the previous section, a system level overview of the operation of an embodiment of the invention was described. In this section, the particular methods performed by the server and the clients of such an embodiment are described by reference to a series of flowcharts. Describing the methods by reference to a flowchart enables one skilled in the art to develop such programs, firmware, or hardware, including such instructions to carry out the methods on suitable computerized clients or servers. In computerized clients, one or more processor of the clients execute the instructions from computer-readable media, and in computerized servers, one or more processors of the clients execute instructions from computer-readable media.

Figure 3:
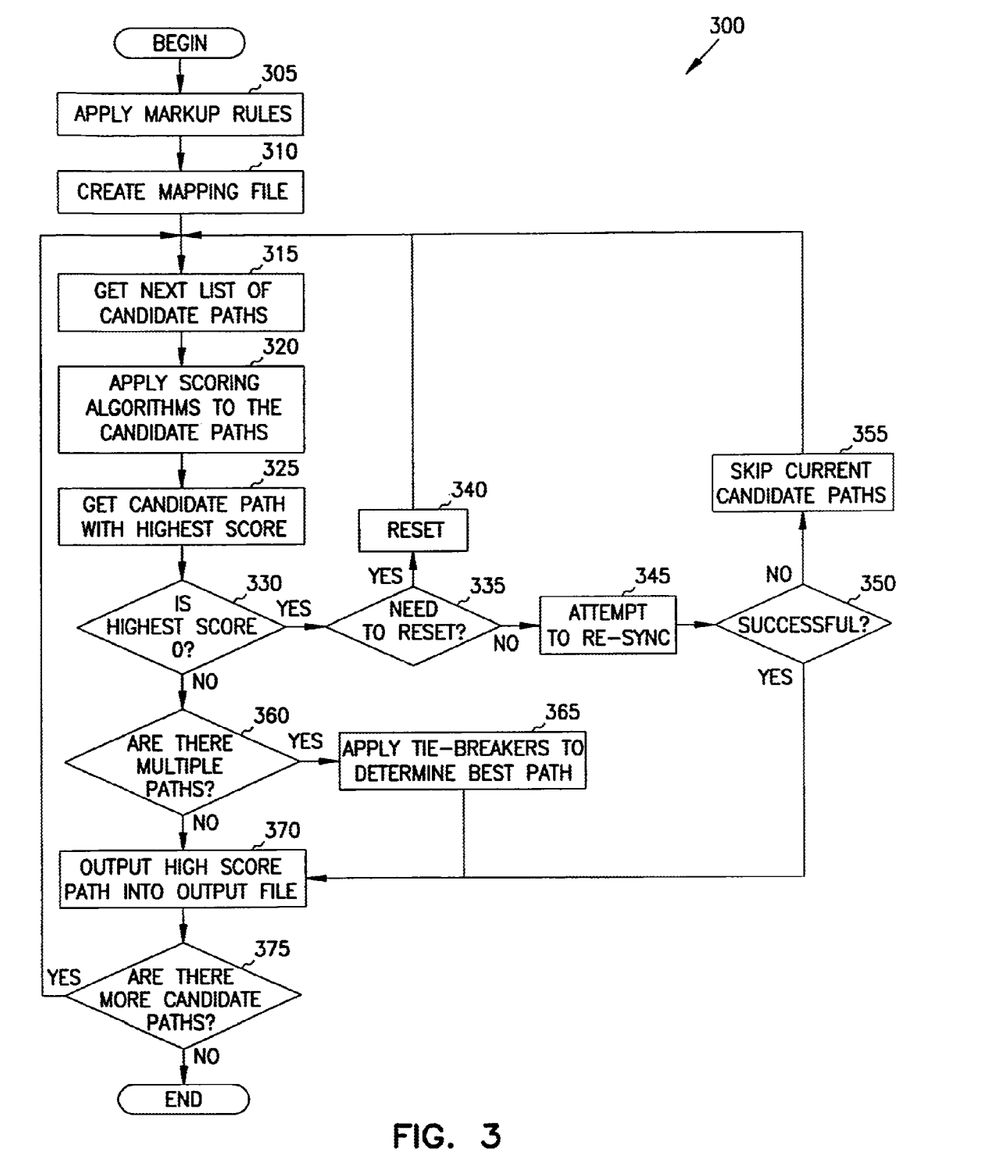
FIG. 3 is a flowchart of an exemplary method for disambiguating data according to the invention.

FIG. 3 shows an exemplary method 300 for disambiguating data according to the invention. Method 300 is performed by a program executing on, or performed by firmware or hardware that is a part of, a computer, such as computer 110 in FIG. 1. Method 300 can be embodied on a computer-readable magnetic, electronic, or optical medium comprising computer-executable instructions.

Ambiguous or ambiguated data has more than one grammatical or semantic interpretation. Ambiguated data is not parseable because the data does not subscribe to a particular set of grammatical or semantic rules that are used in interpreting the data during parsing. More specifically, ambiguous data is data in which it is not certain which path in the tree structure of the DTD to follow in parsing the document, thus the data is unparseable.

Method 300 includes receiving a document and an associated document type definition (DTD). In varying embodiments, the document is received before, during or after the DTD is received.

Method 300 includes applying markup rules in the DTD to the document 305, wherein the markup rules are defined as any programs or pattern-matching processes that can locate the elements of the DTD. The rules must locate the elements in the input file without context of other elements. For example if a rule to locate all "<para>" elements in the input file, when referencing the DTD, the "<para>" element may exist within a "<section>" element and also within a "<chapter>" element. It is frequently necessary to locate the parent elements first, which may in turn have parent elements.

Next, method 300 entails creating a mapping file 310. The mapping file contains all of the locations of the DTD elements in the input file as specified by the markup rules. The mapping file includes one or more nodes, each node representative of a possible mapping of an element of document type definition to a portion of the document. The mapping file is generated from the document and the document type definition Subsequently, method 300 includes generating one or more candidate paths from the mapping file. Each candidate path represents a possible path from one node in the mapping file to another node in the mapping file.

Subsequently, method 300 includes receiving the candidate paths 315 that compose a segment in the mapping file. A segment is a one or more candidate paths starting with a common node and ending with a common node. Disambiguation begins in action 315.

Next, method 300 applies a scoring methodology to the candidate paths 320. A score for each of the one or more candidate paths is determined. In one example, determining one or more scores includes determining two or more scores for each one of the one or more candidate paths and defining the highest of the two or more scores as the determined scored for the one of the one or more candidate paths. DTDs are commonly structured as a hierarchical tree, the tree representing the abstract syntax of tokens in the DTD. In another example, determining the score(s) of the candidates path(s) includes parsing the candidate paths against the DTD by traversing the tree structure of the DTD, comparing a candidate path to the DTD and determining if the candidate path is a valid path or not.

Each node in the DTD tree structure represents a DTD element. The DTD tree structure is traversed by picking a unique path in the DTD tree structure starting at the root node and traversing from node to node to an end node in the tree structure. As the DTD tree structure is traversed, the DTD is mapped to a document encoded according to the DTD. At some particular points in the traversal, the path is ambiguous because there is no unequivocal indication from the encoded document of which one of a number of nodes in the DTD to traverse. Ambiguous situations are problematic because that is a lack of certainty as to how to interpret the elements in the encoded document in consideration of the DTD.

The highest score represents the closest match to the current position in the DTD.

Applying a scoring methodology to the candidate paths includes determining a score in reference to, or based on, compliance with the document type definition without inferring additional tags for each of the one or more candidate paths. More specifically, this action scores a path highly if the path is directly acceptable to the DTD without inferring any additional tags. In two examples, a high score is represented by a "TRUE" in a Boolean scale, or as a score of 100 on a scale of 0 to 100 in which 100 is the highest score. Conversely, a path is scored low if the path is not directly acceptable to the DTD without inferring any additional tags. In two examples, a low score is represented by a "FALSE" in a Boolean scale, or as a score of 0 on a scale of 0 to 100 in which 0 is the lowest score.

Alternatively, a score for each of the candidates paths is determined by determining a score in reference to, or based on, compliance with the document type definition with inferring tags for each of the one or more candidate paths. More specifically, this action scores a path highly, such as a score of 99 on a scale of 0 to 100 in which 100 is the highest score, if the path is acceptable to the DTD with tag inference in reference to, or based on, the rules of the markup language of the DTD, such as SGML. Conversely, a path is scored low, such as a score of 0 on a scale of 0 to 100 in which 0 is the lowest score, if the path is not acceptable to the DTD with tag inference in reference to, or based on, the rules of the markup language of the DTD, such as SGML.

Alternatively, a score for each of the candidates paths is determined by determining a score in reference to, or based on, a recursive examination of each path for a predetermined extent from each node in the tree structure of the mapping file for each of the one or more candidate paths. More specifically, acceptable paths are constructed by "looking ahead" to the other nodes in the document to determine if a particular path will lead to an acceptable path. The lookahead process is controlled by a parameter stored in configuration file that controls how far ahead an attempt to make an invalid path valid is made. This alternative scoring process is a conventional "game tree" action in which a set of N possibilities or the next progression down the tree structure path, each progression is attempted. The scoring process is repeated to determine of the path leads to a successful outcome.

Thereafter, the candidate with the highest score is selected or retrieved 325. Selecting one of the candidate paths based on, or from, the one or more scores generated in action 320.

A determination as to whether the scores of all the candidate paths indicate no match 330. If the determination is negative, then the method continues at action 360. Otherwise, the determination is affirmative and method 300 continues with determining whether or not the disambiguation that began at action 315 must be reset 335. When the determination as to whether or not the disambiguation must be reset, disambiguation is reset 340 in which all data structures associated with disambiguation are reset, and the method continues with receiving a list of candidate paths 315. When the determination as to whether or not the disambiguation must be reset is not affirmative, an attempt to resynchronized 345 in which a determination as to whether any of the candidates paths in the segment are valid, in which the last open start-tag is closed, a list of valid start and end tags that can exist in the DTD are received, and a determination as to whether or not any successful matches to at least one of the candidates paths exist.

After attempting to resynchronize 345, a determination of the success of the resynchronization is performed 350. When the determination indicates that the resynchronization is not successful, the method continues in skipping current candidate paths 355 and the method continues with receiving a list of candidate paths 315, such as a next list of candidate paths.

When the determination 330 that the scores of all the candidate paths indicate a match 330, a determination of whether or not there are multiple paths that have equal scores to each other 360 is performed. When the determination 360 indicates that multiple paths have equal scores, then applying tie-breaking to determine the best path 365 is performed.

When the determination 350 indicates that the resynchronization is successful, or the determination 360 that there are not multiple paths having equal scores, or the determination 360 that multiple paths have equal scores and applying score tie-breaking 365 is performed, thereafter, the candidate path with the highest score is converted to SGML and/or XML (SGML/XML) and transmitted to an output file 370. The selected candidate path is converted into a language described by the DTD 230, which could be SGML or XML depending upon whether the DTD 230 specified SGML or XML. More specifically, an element is generated that complies with the markup language described by the DTD.

Subsequently, a determination of whether more candidates exist in the mapping file 375. If the determination that more candidate paths exist in the mapping file, then the method continues with receiving a list of candidate paths 315, such as a next list of candidate paths.

Where the mapping file includes more than one segments, actions 315-370 will be repeated for each of the additional segments beyond the first segment, in which generating one or more candidate paths from the mapping file will use a singular segment from the mapping from which to generate candidate one or more candidate paths starting with a common solid node and ending with a common terminal node.

SGML/XML Implementation

Figure 4:
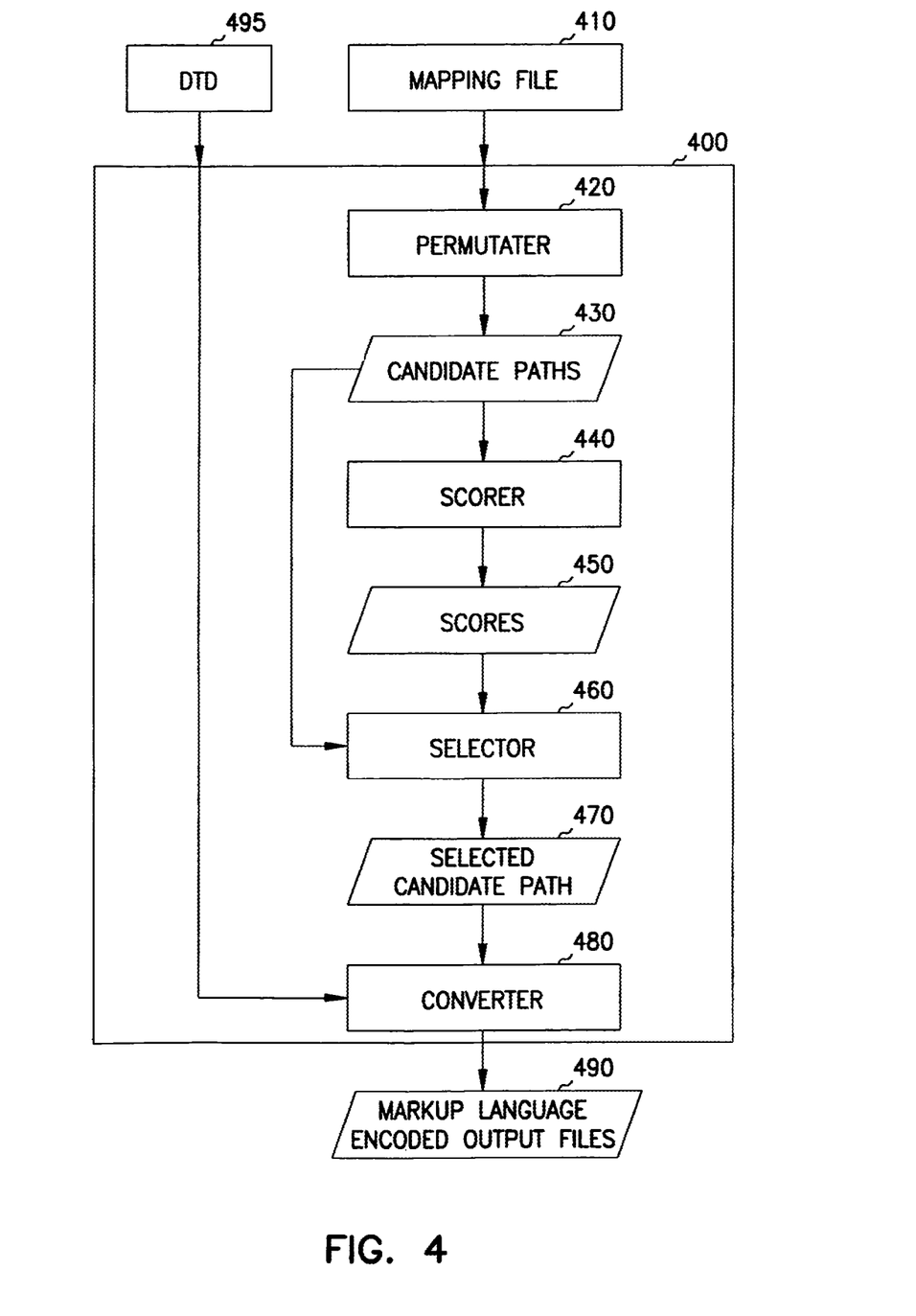
FIG. 4 is a block diagram of an apparatus of an embodiment of the disambiguator of the present invention.

In FIG. 4, a particular SGML and/or XML (SGML/XML) implementation of the invention is described in conjunction with the system the method described in conjunction with FIG. 3 that is SGML/XML related.

Embodiments of the invention are described as operating in a multi-processing, multi-threaded operating environment on a computer, such as computer 110 in FIG. 1.

FIG. 4 is a block diagram of an apparatus 400 of an embodiment of the disambiguator 240 of FIG. 2 of the present invention.

Apparatus 400 includes a permutater 420 of one or more candidate paths 430 from the mapping file 410. The permutater 420 is operatively coupled to the mapping file 410, with each of the one or more candidate paths 430 representing a possible path from one node in the mapping file 410 to another node in the mapping file 410.

A scorer 440 receives the one or more candidate paths 430 from the permutater, yielding a corresponding number of one or more scores 450.

Apparatus 400 also includes a selector 460 that receives the candidate path 430, and the one or more scores 450, and selects candidate path having the highest score, yielding a selected candidate path.

A converter 480 converts the selected candidate path 470 into an output file 490 encoded in the markup language described by the DTD 495, the markup language being either SGML or XML depending upon which markup language is described by the DTD 495. The converter 480 is operatively coupled to the selector 460 and receives the selected candidate path 470 and also receives the document type definition 495.

Figure 5:
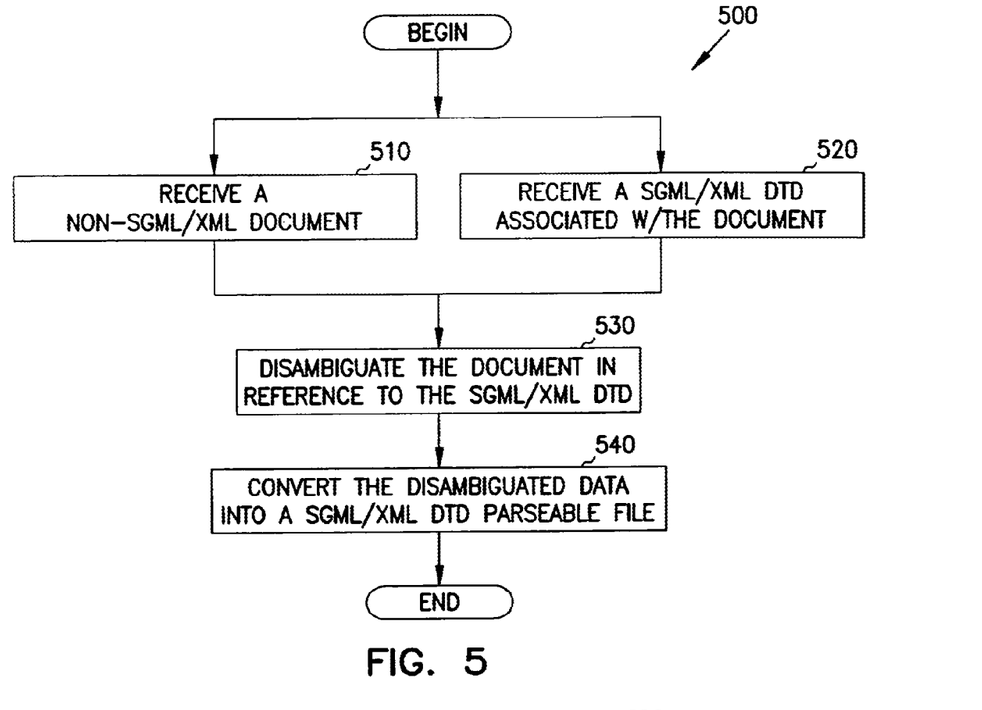
FIG. 5 is a block diagram of an exemplary method for producing a SGML DTD parseable file of an embodiment of the present invention.

FIG. 5 is a block diagram of a method 500 for producing a SGML DTD parseable file of an embodiment of the present invention. Method 500 includes receiving a non-SGML document 510. The method also includes receiving a SGML DTD associated with the document 520. In varying embodiments, receiving 510 can be performed before, during or after receiving 520. The DTD may also be embedded in the document. Thereafter, the method includes disambiguating the document in reference to, or based on, the SGML DTD 530. Disambiguating 530 yields disambiguated data. Subsequently, the method includes converting the disambiguated data into a file parseable in reference to, or based on, the SGML DTD 540.

Figure 6:
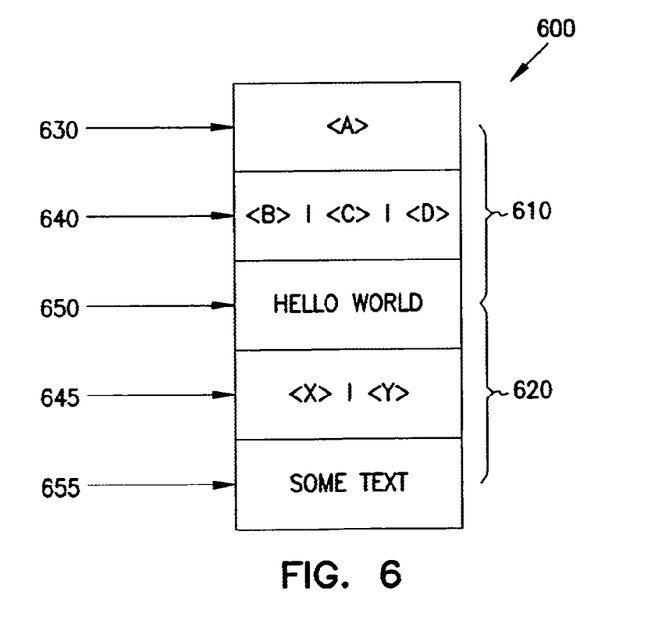
FIG. 6 is a block diagram of an exemplary mapping file data structure incorporating the invention.

FIG. 6 is a block diagram of a mapping file data structure 600 on a computer-readable medium for representing a possible mapping of one or more elements of a document type definition to a portion of a document in an implementation of the invention. The mapping file data structure includes one or more segments, such as a first segment 610 and a second segment 620. A segment is a one or more candidate paths starting with a common solid node and ending with a common terminal node.

Each of the segments includes a field storing data representing a solid node 630. A solid node 630 is a node encoded in SGML/XML markup language as the node originally existed in the document. The solid node 630 can represent either a SGML/XML start-tag, represent a SGML/XML end-tag, or represent the result of a markup rule locating a single element, such as a SGML/XML start-tag or a SGML/XML end-tag, at the position of the node in the document. The solid node 630 contains the SGML/XML element. One example of a SGML/XML element that a segment could comprise is chapter element.

Furthermore, each of the segments includes a field storing data representing a quantum node, such as quantum nodes 640 of segment 610 and quantum node 645 of segment 620. A quantum node is a node that represents multiple alternative tagging options for a single point in the document as created by the markup rules. Quantum nodes 640 and 645 represent two or more of the following: a SGML/XML start-tag, a SGML/XML end-tag, and a SGML/XML end-tag. A full-tag represents the start-tag followed by the content of the start-tag followed by the corresponding end-tag. Quantum node 640 contains one or more SGML/XML elements, such as a section element, a part element or a topic element, where the solid node 630 contains a chapter element. The quantum node 630 of segment 2 620 contain a SGML/XML element.

Each of the segments also includes a field storing data representing a terminal node, such a terminal 650 of segment 1 of 610 and terminal node 655 of segment2 620. A terminal node cannot contain further subnodes. The terminal node 650 contains text "Hello World" and the terminal node 655 contains text "some text."

In addition, where the mapping file data structure 600 comprises two or more segments, such as segment 1 and segment 2, and where two contiguous segments, such as segment 1 and segment 2 are joined, in such a manner that the field storing data representing a terminal node of the first segment is the field storing data representing a solid node of the second segment.

Figure 7:
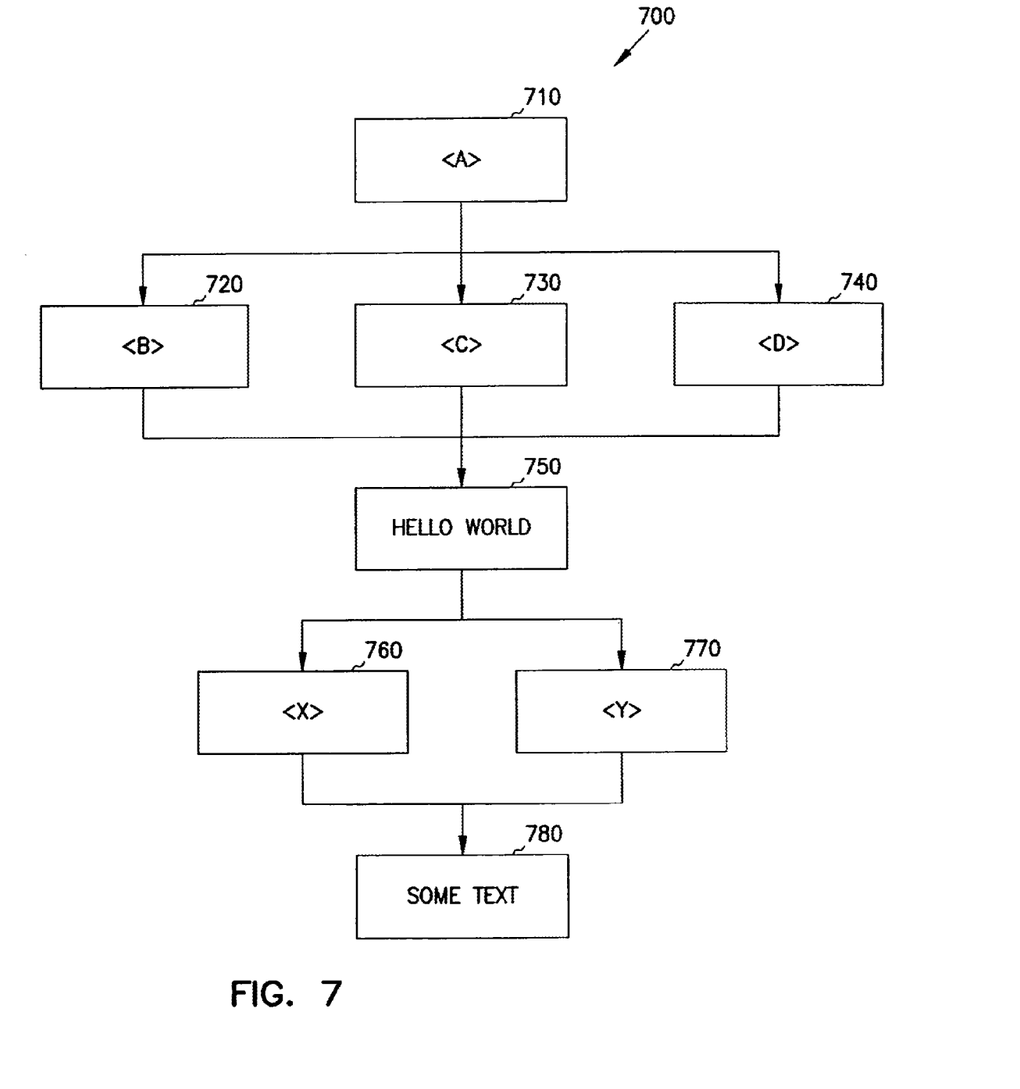
FIG. 7 is a block diagram of an exemplary data structure for representing candidate paths of a segment of an element of ambiguated document in an implementation of the invention.

FIG. 7 is a block diagram of a data structure 700 on a computer-readable medium for representing candidate paths of a segment of an element of ambiguated document in an implementation of the invention.

Data structure 700 is a tree structure that represents the first segment 610 in FIG. 6. Node 710 represents the solid node 630 in FIG. 6. Node 710 is linked to node 720, node 730, and node 740, which represent each of the elements "<B>" "<C>" and "<D>" in quantum node 640 of the first segment 610 in FIG. 6, respectively. Node 750 represents the terminal node 650 of the first segment 610 in FIG. 6.

All permutations of the various paths that can be traversed in data structure 700 are shown in Table 1:

TABLE 1

<A><B>Hello World
<A><C>Hello World
<A><D>Hello World

Table 1 identifies the candidate paths that are scored and from which a candidate path is selected. Each candidate path represents a possible path from one node in the mapping file to another node in the mapping file data structure 700.

Figure 8:
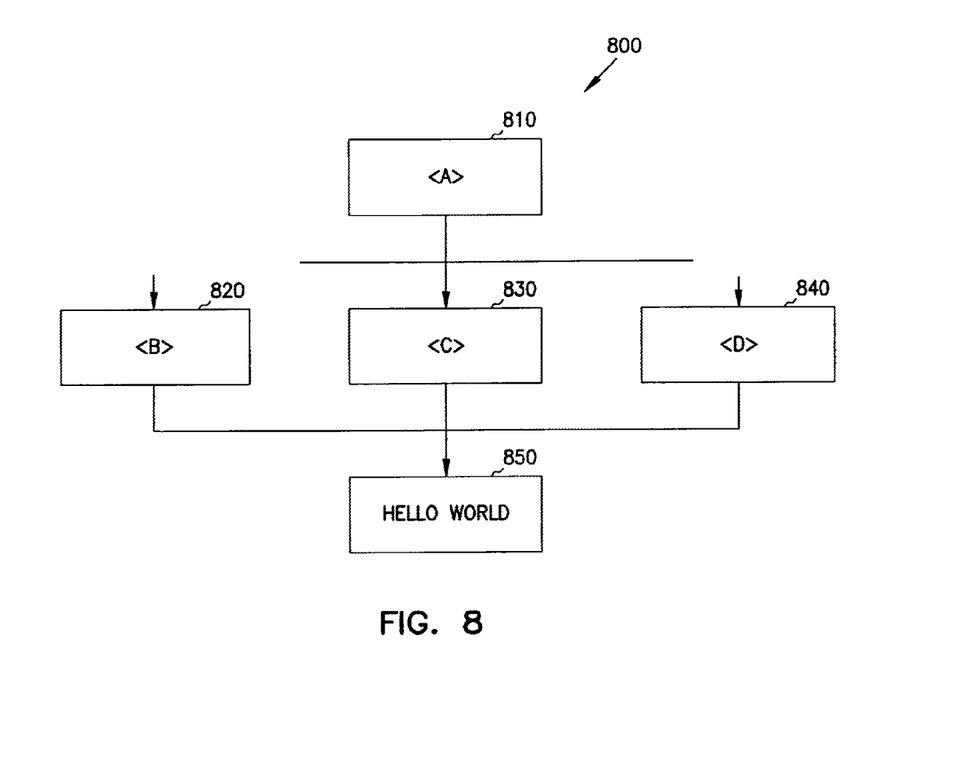
FIG. 8 is a block diagram of an exemplary data structure for representing candidate paths of two contiguous segments of elements of ambiguated document in accord with the invention.

FIG. 8 is a block diagram of a data structure 800 on a computer-readable medium for representing candidate paths of two contiguous segments of elements of ambiguated document in an implementation of the invention. Data structure 800 is a tree structure that represents the contiguous first segment 610 and second segment 620 in FIG. 6. Node 810 represents the solid node 630 in FIG. 6. Node 810 is linked to node 820, node 830, and node 840, which represent each of the elements "<B>" "<C>" and "<D>" in quantum node 640 of the first segment 610 in FIG. 6, respectively. Node 850 represents the terminal node 650 of the first segment 610 in FIG. 6. Node 850 is linked to node 860 and node 870, which represent each of the elements "<X>" and "<Y>" in quantum node 640 of the second segment 620 in FIG. 6, respectively. Node 860 and node 870 are linked to node 880 which represents the terminal node 650 of the second segment 620 in FIG. 6.

All permutations of the various paths that can be traversed in data structure 800 are shown in Table 2:

TABLE 2

<A><B>Hello World<X>some text
<A><C>Hello World<X>some text
<A><D>Hello World<X>some text
<A><B>Hello World<Y>some text
<A><C>Hello World<Y>some text
<A><D>Hello World<Y>some text Table 2 identifies the candidate paths that are scored and from which a candidate path is selected. Each candidate path represents a possible path from one node in the mapping file to another node in the mapping file data structure 800.

Apparatus 200 and 400 can be embodied on a computer-readable magnetic, electronic, or optical medium comprising computer-executable instructions to perform method 300. Furthermore, data structures 600, 700 and 800 can be embodied on a computer-readable magnetic, electronic, or optical medium.

More specifically, in the computer-readable program embodiment, the programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (A.P.I.) or interprocess communication techniques such as remote procedure call (R.P.C.), common object request broker architecture (CORBA), Component Object Model (COM), Distributed Component Object Model (DCOM), Distributed System Object Model (DSOM) and Remote Method Invocation (RMI). The components execute on as few as one computer as in computer 110 in FIG. 1, or on at least as many computers as there are components.

CONCLUSION

In furtherance of the art, the inventors have devised systems, methods, and software for generating data parseable against an arbitrary set of one or more document type definitions (DTDs). One exemplary method entails generating a list of a possible paths of an input element of data that is not encoded according to the DTD, determining the path that is the best fit with the DTD, and then generating the element in the syntax of the DTD. Determining the path that is the best fit entails parsing the path against the DTD. The best fit is expressed in a scoring scale, in which the best score indicates the best fit. Thereafter, the path with the best fit is translated in accordance to the DTD.

Although specific embodiments have been illustrated and described herein, any arrangement which is calculated to achieve the same purpose may be substituted for the specific embodiments shown. This application is intended to cover any adaptations or variations of the present invention. One of ordinary skill in the art will appreciate that the invention can be implemented in an object-oriented design environment, a procedural design environment, or any other design environment that provides the required relationships. In particular, one of skill in the art will readily appreciate that the names of the methods and apparatus are not intended to limit embodiments of the invention. Furthermore, additional methods and apparatus can be added to the components, functions can be rearranged among the components, and new components to correspond to future enhancements and physical devices used in embodiments of the invention can be introduced without departing from the scope of embodiments of the invention. One of skill in the art will readily recognize that embodiments of the invention are applicable to future communication devices, different file systems, and new data types.

The embodiments described above are intended only to illustrate and teach one or more ways of practicing or implementing the present invention, not to restrict its breadth or scope. The actual scope of the invention, which embraces all ways of practicing or implementing the teachings of the invention, is defined only by the following claims and their equivalents.

The invention claimed is:

1. A system for transacting in electronic commerce comprising:
    a processor;
    a storage device coupled to the processor; and
    software means operative on the processor for:
        disambiguating ambiguated data based on a document type definition, wherein the disambiguating the ambiguated data includes:
        mapping portions of the ambiguated data to potential elements defined in the document type definition to generate a mapping file of the ambiguated data, wherein each mapping of a potential element defined in the document type definition to a portion of the ambiguated data is represented by a node in the mapping file; and
        generating more than one permutation of candidate paths from the mapping file of the ambiguated data, wherein each candidate path represents a possible path from one node, representing a mapping of one potential element to a portion of the ambiguated data in the mapping file to another node, representing a mapping of another potential element to the portion of the ambiguated data, in the mapping file.

2. The system of claim 1, wherein the software means is further operative on the processor for selectively converting disambiguated data to one of a plurality of markup languages.

3. The system of claim 1, wherein the software means is further operative on the processor for:
- determining a score for each of the permutations of candidate paths; and
- selecting one of the candidate paths based on the score for each of the permutations.

4. The system of claim 3, wherein determining the score for each of the candidate paths includes determining based on at least one of:
- the document type definition without inferring additional tags for each of the candidate paths;
- the document type definition with inferring tags for each of the candidate paths; and
- a recursive examination of each path for a predetermined extent from each node of the mapping file for each of the candidate paths.

\* \* \* \* \*

UNITED STATES PATENT AND TRADEMARK OFFICE
CERTIFICATE OF CORRECTION

| | | |
|---|---|---|
| PATENT NO. | : 9,652,439 B2 | |
| APPLICATION NO. | : 14/450963 | |
| DATED | : May 16, 2017 | |
| INVENTOR(S) | : Michael S. Zaharkin | |

It is certified that error appears in the above-identified patent and that said Letters Patent is hereby corrected as shown below:

In the Specification

At Column 7, starting at Line number 18, delete the paragraph reading:
"Where the mapping file includes more than one segments, actions 315-370 will be repeated for each of the additional segments beyond the first segment, in which generating one or more candidate paths from the mapping file will use a singular segment from the mapping from which to generate candidate one or more candidate paths starting with a common solid node and ending with a common terminal node."
And replace with:
--Where the mapping file includes more than one segments, actions 315-370 will be repeated for each of the additional segments beyond the first segment, in which generating one or more candidate paths from the mapping file will use a singular segment from the mapping from which to generate candidate paths. A segment is a one or more candidate paths starting with a common solid node and ending with a common terminal node.--.

At Column 7, Line number 31, delete "the system the method" and replace with --the system overview in Fig. 2 and the method--.

At Column 7, Line number 49, delete "path" and insert --paths--.

At Column 8, Line number 29, delete "segment 610 and quantum node 645 of segment 620" and replace with --segment1 610 and quantum node 645 of segment2 620--.

Signed and Sealed this
Tenth Day of October, 2017

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,652,439 B2

In the Claims

At Column 10, Claim number 1, Line number 60, add --,-- after "data".